United States Patent
Frommer et al.

[11] Patent Number: 5,947,369
[45] Date of Patent: Sep. 7, 1999

[54] ELECTRONIC TIME BADGE

[75] Inventors: Myron H. Frommer, Monsey; David J. Haas, Suffern, both of N.Y.

[73] Assignee: Temtec, Inc., Suffern, N.Y.

[21] Appl. No.: 08/718,268

[22] Filed: Sep. 20, 1996

Related U.S. Application Data

[60] Provisional application No. 60/004,090, Sep. 21, 1995.

[51] Int. Cl.$^6$ ............................................. G06K 7/10
[52] U.S. Cl. ........................ 233/382; 235/380; 235/382.5
[58] Field of Search .................................. 235/382, 465, 235/457, 380, 382.5, 487, 488; 368/327; 116/200, 206

[56] References Cited

U.S. PATENT DOCUMENTS

| | | | |
|---|---|---|---|
| 3,801,775 | 4/1974 | Acker | 235/462 |
| 3,825,734 | 7/1974 | Jacobs et al. | 235/462 |
| 3,835,297 | 9/1974 | Inoue et al. | 235/462 |
| 3,873,812 | 3/1975 | Stein et al. | 235/462 |
| 4,044,227 | 8/1977 | Holm et al. | 235/462 |
| 4,283,623 | 8/1981 | Von Stein et al. | 235/465 |
| 4,359,633 | 11/1982 | Bianco | 235/468 |
| 4,481,887 | 11/1984 | Urbano | 109/3 |
| 4,528,073 | 7/1985 | Sano et al. | 204/15 |
| 4,538,059 | 8/1985 | Rudlan | 235/468 |
| 4,795,069 | 1/1989 | Ferrill | 234/202 |
| 4,860,269 | 8/1989 | Hennings et al. | 368/107 |
| 5,045,283 | 9/1991 | Patel | 422/56 |
| 5,053,339 | 10/1991 | Patel | 436/2 |
| 5,100,005 | 3/1992 | Noble et al. | 209/583 |
| 5,287,414 | 2/1994 | Foster | 382/1 |
| 5,400,722 | 3/1995 | Moses et al. | 109/2 |
| 5,528,563 | 6/1996 | Tothill et al. | 368/327 |
| 5,602,804 | 2/1997 | Haas | 368/327 |
| 5,605,738 | 2/1997 | McGinness et al. | 428/195 |
| 5,615,622 | 4/1997 | Moses et al. | 109/2 |
| 5,633,835 | 5/1997 | Haas et al. | 368/327 |
| 5,633,836 | 5/1997 | Langer et al. | 368/327 |
| 5,699,326 | 12/1997 | Haas et al. | 368/327 |
| 5,715,215 | 2/1998 | Haas et al. | 368/327 |
| 5,719,678 | 2/1998 | Reynolds et al. | 235/383 |
| 5,719,828 | 2/1998 | Haas et al. | 368/327 |
| 5,756,356 | 5/1998 | Yanagi et al. | 436/7 |
| 5,822,280 | 10/1998 | Haas | 368/327 |

*Primary Examiner*—Donald Hajec
*Assistant Examiner*—Douglas X. Rodriguez
*Attorney, Agent, or Firm*—Michael Zall

[57] ABSTRACT

A security system is provided that includes a time dependant security badge to be worn by a person. The security badge includes a metalized reflective film having an upper surface and lower surface, the upper surface having an initial reflectivity. An oxidizing film for electrochemically oxidizing the initial metalized reflective surface to a final reflectivity after the passage of a predetermined period of time is placed in contact with the lower surface of the metalized film. The badge is illuminated with a predetermined wavelength of light and then scanned, e.g., with a CCTV, to detect the reflectivity of the upper surface of the metalized reflective film to signal an initial security status of the person when it detects the initial reflectivity of the metalized reflective film and to signal a final security status of the person when it detects the final reflectivity of the metalized reflective film.

4 Claims, 7 Drawing Sheets

ELECTRONIC TIME BADGE

RELATED APPLICATIONS

This application is related to the provisional application U.S. Serial No. 60/004,090, filed Sep. 21,1995.

BACKGROUND OF THE INVENTION

1. Field of the Invention

This invention relates to a security system, and in particular to an identification badge verification system that detects changes in the reflectivity of a time dependant security or identification badge after a predetermined period of time, e.g., one week, one month, three months, etc.

2. Prior Art

A major problem with temporary identification or security badges is preventing expired, lost and/or uncollected badges from being reused. A known solution to this problem is the use of self expiring badges, i.e., badges that after a period of time indicate thereon that they are expired and that the person does not have access to the secured area. Such time indicators are useful, for example, not only as security badges but also as a means for determining the length of time a perishable item, e.g., food, photographic film, etc., has been on a wholesaler's or retailer's shelf.

Many of these known time indicators, which are generally short term time indicators, are based on the migration of ink from one substrate through another substrate, i.e. in a path perpendicular to the surface of the substrate. After the ink migrates through the substrate(s) it is viewed on a display surface to thereby indicate that the predetermined time has elapsed. Other known time indicators are based on the migration of liquids, jellies or inks through wicks or migration paths to indicate the passage of time. Still other indicators rely primarily upon chemical reactions to cause a visually perceptible change over a desired time period rather than the migration of fluids or compounds.

More specifically:

U.S. Pat. No. 4,212,153 to Kydonieus, et al describes a laminated indicator that changes in a visually perceptible mode with the passage of time. The indicator comprises at least two layers whereby the molecular migration of an agent in an interior layer to the outermost surface of the exterior layer causes a change which is visually perceptible.

U.S. Pat. Nos. 4,432,630, 4,542,982 and 4,779,120 to Haas describe badges with an ambient light sensitive coating thereon which when exposed to ambient light for a specified period of time change to a specified color.

U.S. Pat. No. 4,903,254 to Haas describes a time indicator with a plurality of layers that are adhered together. The indicator has a front part and a rear part. The rear part includes an ink film layer upon a backup layer. At issuance, the front part and rear part are adhered together and the ink migrates from the rear part into the front part.

U.S. Pat. No. 5,058,088 to Haas describes a timing indicator type badge, label or display wherein the relative amount of time that has elapsed from the initial activation of the timing indicator can be easily determined by the progression of a visually perceptible change in color along different areas of the timing indicator. This timing indicator comprises a clear self-adhesive film which is placed over a printed substrate in order to activate the timing indicator. The printed substrate includes a migrating or soluble ink which migrates along the substrate to produce a visual color change.

U.S. Pat. No. 5,107,470 to Pedicano describes a quick acting indicator including a migrating ink that migrates through an opaque layer to display a message. Upon removal of a release paper, a coated indicator portion is brought into contact with a printed base portion, and a printed message migrates through a noncuring layer to display the printed message.

U.S. Pat. No. 5,364,132 Haas et al. describes a reusable self-expiring security identification badge. When the badge is issued, the inked substrate is attached to the base substrate, the inked substrate covering the void indicia area. The overlay substrate is then placed over and attached with the soluble ink of the ink substrate. The ink dissolver of the overlay substrate contacts and co-acts with the soluble ink of the inked substrate to dissolve the ink and allow the ink to migrate through to the overlay substrate to the display surface, where it can be visually perceived, in a preselected time interval.

Applicant has discovered, however, that there are several problems associated with these known time dependant self expiring security or identification badges. In particular, long term, e.g., months, years, etc., identification badges that produce a color change to indicate that a predetermined length time has expired, have the following problems or shortcomings:

1. The diffusion of dye molecules cannot be easily controlled in a step function.
2. Barriers that are made of organic and inorganic (non-metallic) materials are difficult to maintain in a stable condition over months and years, i.e., they have a poor shelf-life. More specifically, the thickness and concentration of the various components is difficult to control over such long periods of time.
3. Organic and inorganic (non-metallic) barriers cannot be produced in very thin layers, e.g., hundreds or tens of thousands of Angstroms.

Additionally, most known security systems that use identification badges rely on a security guard's or receptionist's visual acuity to inspect the badges of people approaching a designated area. This must be done on an individual basis no matter how many people are passing through the area, is inefficient and laborious.

The present invention is designed to compliment the visual acuity of the security personnel with an automatic system that will sound an alarm when an invalid badge has moved into the area monitored. The present invention is particularly useful in high traffic areas such as airports, public and government buildings, such as courts, or other large facilities where many people move through a confined space in rapid succession.

Several additional U.S. Patents could be relevant to the invention herein; in particular: U.S. Pat. No. 4,258,000 to Obermayer; U.S. Pat. No. 4,661,983 to Knop; U.S. Pat. No. 5,095,194 to Barbanell;and U.S. Pat. No. 5,317,987 to Müller et al. In particular:

U.S. Pat. No. 4,258,000 to Obermayer describes a toxic-monitoring material for monitoring of toxic fluids placed in contact with or exposed to the monitoring material. The material comprises a transparent microporous material that has therein a liquid composition that includes a reactant which reacts with the toxic component to change in color or appearance throughout the material.

U.S. Pat. No. 4,661,983 to Knop describes a technique for determining whether an individual item of sheet material is counterfeit. The sheet material incorporates an authenticating material that exhibits a predetermined macroscopic reflectivity characteristic.

U.S. Pat. No. 5,095,194 to Barbanell describes a holographic credit card with an automated verification system.

U.S. Pat. No. 5,317,987 to Müller, et al. discloses an indicator for display of elapsed times consisting of a base to which a chemical substance is applied and a barrier which is fastened to the base to seal the chemical substance to the base. The barrier may have a legible indication such as a letter. A second chemical substance is applied to the top of the barrier and enclosed by a covering foil. Selective pitting of the barrier permits one or both of the chemical substances to penetrate the barrier to uncover the colored base. The barrier may be constructed from commercial aluminized polymer sheet material. The visible change of the barrier in the chemical substances selected may cause a luminescence reaction which may be detected optoelectronically for automated use of the indicator. Other metal layers on epoxide paper, polyester or polyamide film may be used for the barrier.

None of these patents teach or suggest applicants invention and the unexpected benefits derived therefrom.

OBJECTS AND SUMMARY OF THE INVENTION

It is an object of this invention to provide a security system that automatically scans persons entering a controlled area to determine if they have attached to them a security identification badge that is valid or expired.

It is a further object of this invention to provide a security identification badge that can be easily scanned to determine the badge that is valid or expired.

It is yet another object of this invention to provide a metalized security identification badge that can be easily scanned for its reflectivity status to determine if the badge is valid or expired.

It is a further object of this invention to provide a metalized security identification badge wherein the reflectivity of the badge changes over a predetermined period of time to indicate change the status of the badge from valid to expired.

The foregoing objects of this invention are achieved the security system of this invention. The system includes a time dependant security badge to be worn by a person. The security badge comprises a metalized reflective surface having an initial reflectivity. A means, preferably electrochemical, is included in the badge for changing the initial reflectivity of the metalized reflective surface to a final reflectivity after the passage of a predetermined period of time. An attachment means is provided for attaching the badge to a person. The system further includes a means for scanning and detecting the reflectivity of the metalized reflective surface, preferably a CCTV system, to signal an initial security status of the person when it detects the initial reflectivity of the metalized reflective surface (valid-entry permitted) and to signal a final security status of the person when it detects the final reflectivity of the metalized reflective surface (expired-entry not permitted).

BRIEF DESCRIPTION OF THE DRAWING

For the sake of brevity, in all of the Figures all similar elements are designated by the same element number.

DESCRIPTION OF THE PREFERRED EMBODIMENTS

Figure 1:
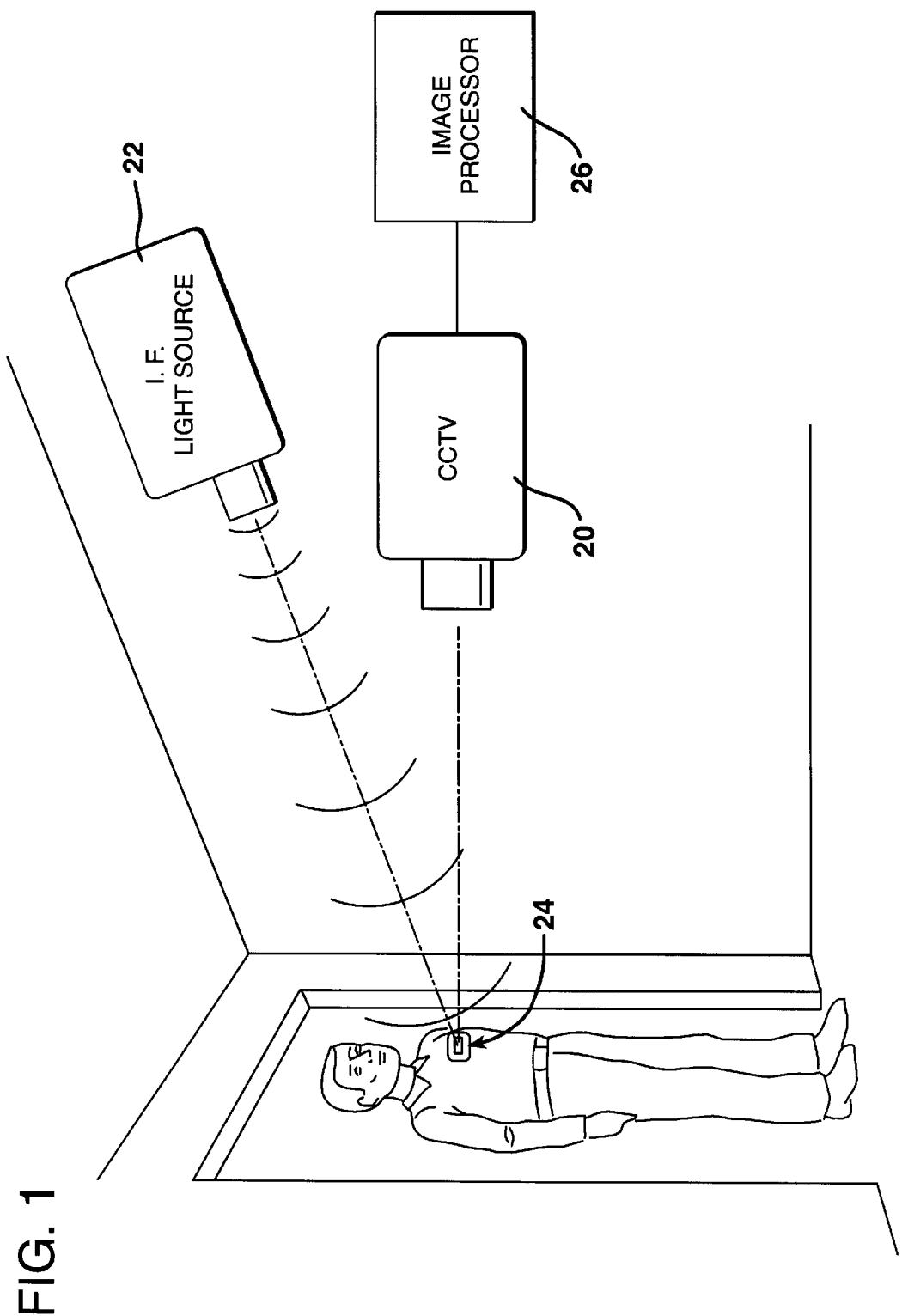
FIG. 1 shows the identification badge and system of this invention in use by person entering a controlled area.

Referring to FIG. 1, in the security system of this invention 100 a CCTV camera 20 views each person entering a controlled area, through for example a doorway or hallway. A light source 22, preferably an infrared (IR) light source, for example, illuminates an entrance doorway. The IR source is invisible to the individual but illuminates the badge 24 that is attached to the person. The light reflects from a "spot" on the badge 24 that is a reflective metalized film or surface 28. As the individual enters the facility through the doorway being monitored, the identification badge 24 (embodiments of which are depicted in FIGS. 2–10) is scanned, observed, and/or monitored by the CCTV camera 20 and the video image of the person immediately analyzed to confirm that they are wearing a valid identification badge 24. The CCTV camera 20 is connected to an automated imaging system or processor 26. The imaging system 26 analyzes the signal from the CCTV camera 20 for the correct reflected image of the badge 24. If the reflective image is absent when a person appears, or if the badge 24 is not valid or it has expired, the image processing system 26 will alert a security guard by some type of alarm, e.g., visual or sound alarm.

Alternatively, the CCTV camera 20 views the person with the badge 24 that contains a very bright "reflective" symbol that is detected and analyzed by an image processor 26. If the identification badge 24 of the person is found not to contain the required reflective symbol, an alert is sounded. This "reflective" symbol will disappear after a predetermined time interval, i.e. a day, week, month, year, etc.

In all cases an alert will be communicated to the security personnel if the person passing through the controlled area is not wearing a badge 24, the badge 24 is counterfeit, modified or not authentic, the badge 24 has been voided by the expiration of the predetermined time period, or the badge 24 has been previously voided by a security officer after collection.

The security system of this invention permits a large facility to screen each and every person for a valid identification badge 24 by means of a distant-viewing, non-contacting, CCTV camera.

The system of this invention replaces the procedure wherein a guard physically examines all identification badges 24 passing his post. The system permits the controlled use of temporary identification badges 24 for short-term visitors, e.g., contractors, temporary staff. In addition, the system may be used for those wearing long term, i.e., 1 or 2 year, identification badges 24, e.g., employee badges 24 which must be periodically renewed.

In the preferred embodiment, the identification badge 24 is permanently laminated or sealed in a clear plastic before issuing the badge 24. Various information may be printed on the badge 24, e.g., alphanumeric characters, bar codes, photographs and symbols. The preferred badge 24 has the same dimensions as a standard credit card.

The identification badge 24 used in this system has thereon, readily visible, for example, to the CCTV camera 20, a reflective metal film 28. Applicant has discovered that the use of a reflective metal film 28 in a time dependant identification badge 24 has many unexpected benefits, particularly when used for long term time indicators. It has been discovered that metal films 28 provide a useful reflective, opaque appearance; may be produced and/or coated by evaporation or from solution in very precise thin, reproducible thicknesses; the thicknesses of such metal films 28 may be measured easily and over large areas by simple electrical measurements; pin-holes or voids in a coated or deposited film 28 may be detected easily; the destruction of a metal film 28 as in this invention, may provide additional effects beyond optical properties, such as destroying an RF tuned circuit or an electrical conducting circuit for electrical detection of its state; metal films 28 may provide holographic images for verification and security identification purposes; and patterns in metal films 28 may be detected by optical pattern recognition means. In a preferred embodiment, the metal film 28 acts as a sacrificial anode and becomes oxidized or chemically depleted as a result of an electrochemical reaction, hence resulting in a change in its reflectivity, transparency, opacity, color or electromagnetic properties In one preferred embodiment of the identification badge 24 used in the security system of this invention, the metalized film 28 is secured to a clear substrate 30. The metalized reflective film or layer 28, is changed from an opaque, reflective film 28 (over various spectra) to a transparent film 28 after a predetermined period of time (1 week, 3 months, or 12 months) by oxidizing the metal film 28, such as aluminum, to an oxide. Thus, when such a system is used in a security identification badge 24, if the metalized film 28 has a reflective surface, hologram or metalized pattern, the predetermined time interval has not passed. If the reflective appearance of the metalized film 28 is absent and/or one can see the underlying pattern, then the predetermined time interval has passed and the badge 24 is invalid.

An underlying printed surface 32 may be used under the metalized film 28 to visually indicate to an observer, upon depletion of the reflective material and conversion of the film 28 to a transparent film, that the badge 24 has expired. The principle behind the depletion process of the reflective material is a corrosion process (or electrochemical cell).

Figure 2:
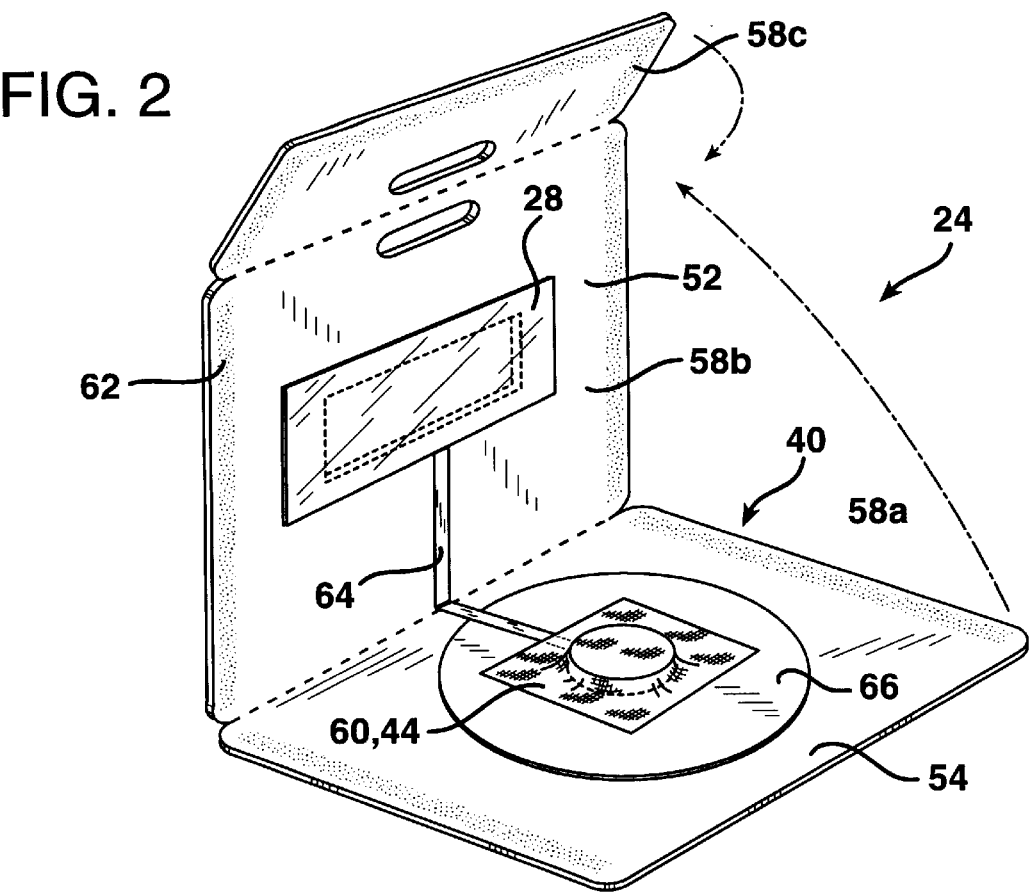
FIG. 2 shows an embodiment of the identification badge of this invention prior to activation.

In a preferred embodiment the identification badge 24 is enclosed in a laminate clear plastic case, generally 34. (See FIG. 2) The case 34 may be constructed of several pieces or as indicated in FIG. 2 may be a single piece of clear plastic film, foldable at several crease lines and sealed. An information insert 36 that contains printed information thereon, such as name, ID number and company logo, may be inserted beneath the clear plastic film for continuous visual viewing. The information insert 36 has an opening 38 therein for the "time indicator", generally 40. The time indicator 40 is preferably an "electrochemical time indicator".

The construction of the time indicator 40 is similar to an electrochemical battery with a load (resistance). Generally, two electrochemical reactions occur (oxidation and reduction), one at each electrode. The electrodes are separated by an ionically conductive phase, (gel). The combination yields an electrical potential difference between the electrodes.

The time indicator 40, includes a backing or support, comprised of: a metal film 28 applied to a clear plastic sheet 30 serving the function of an electrode; a counter electrode 42; an electrolyte 44; and a load (resistive system) 46. Upon assembly, or activation, the reflective film 28 gradually begins to deplete initiating the timing process.

In one embodiment, the metal film 28 is comprised of multiple layers of conductive materials such as metal, metal oxide and electroconductive polymers. The multiple layers are deposited on a clear plastic sheet 30, such as polyethylene terephthalate. The first layer of the metal film 28 is in intimate contact with the plastic sheet 30, may be composed of indium oxide, tin oxide or indium tin oxide. This first layer should be transparent or semi-transparent and of minimal thickness. Deposited on top of this first layer is a reflective metal such as aluminum of known and substantial thickness (such as 500 Å). The thickness of the aluminum plays an important role in the timing aspect. An intermediate layer between the two metal layers may also be used to improve the adhesion of the aluminum to the underlying layer. The intermediate layer may be composed of chromium oxide. The purpose of the underlying layer is to provide consistent electrical contact to the depleting aluminum. This is needed for thick aluminum films (>1,000 Å). The metal layers may be deposited on the clear polymer substrate 30 by any known method such as vapor deposition or evaporating liquid coating solutions.

An image or pattern may be embossed into the film 28 that provides a distinct reflective pattern. The pattern may be seen by human eye or by the verification system, i.e., 20, 22, 26. The image may be a retroreflector or diffraction gradient. Any shape or symbol may be used provided the verification system can detect or accept the image.

The counter electrode 42 may be composed of any conductive material that allows a counter electrochemical reaction to occur. Examples of such materials are: Silver/ Silver chloride, carbon, or impregnated conductive ribbon/ tape or adhesive. The preferred material is Arclad 8001, electroconductive tape from Adhesives Research, Inc. Another preferred material is a conductive ink such as SS4870, silver/silver chloride conductive ink supplied by Acheson Colloids Company, Port Huron, Mich.

The electrolyte 44 may be composed entirely of a gel, paste, or an ionically conductive solid or liquid. The electrolyte 44 contains various cations and anions. The electrolyte 44 allows the flow of electrical charge via the movement of ions. A preferred electrolyte 44 is a chloride compound such as potassium chloride or silver chloride. Two electrolyte 44 phases separated by a salt bridge or barrier may also be used. The preferred electrolyte 44 is an organic gel, ProCam Hydrogel RG-63T from Ludlow Technical Products, Chicopee, Mass.

The two electrodes 28, 42 are connected by an electrical load or resistive system 46. The electrical load 46 may be any type of impedance such as a resistor. An electrical connection of little or no resistance, instead of a load, may be used, however, this leads to very short expiration periods. The use of a resistor 46 of known value controls (slows) the rate of electrical charge migration. The resistive material 46 may be any known resistive material commonly used such as ceramics, carbon/silver filled materials, or electroconductive polymers. The preferred resistive system 46 comprises a resistive ink, SS24210, supplied by Acheson Colloids Company, Port Huron, Mich. The ink may be mixed with a silver based conductive ink such as Electrodag R 423SS. The resistance may be controlled by several factors, such as mixture ratio, cure time, cure temperature, and geometry. Electrical connections between the resistive (ink) material 46 and the electrodes 28, 42 may be obtained by direct metal contact, conductive epoxy or preferably by a conductive adhesive, generally 48.

A backing layer 50 may be used to support the counter electrode 42 and the electrolyte 44. The backing 50 may have printed information, an image, alphanumeric or a color that may be seen when the reflective metal film 28 becomes semi-transparent.

The electrochemical time indicator 40 is assembled from two parts, a front part 52 and a back part 54. The front part is or includes the reflective metalized film 28. When the two parts 52, 54 are assembled together, badge 24 is activated and the time processes begins. The back part 54 comprises the remaining elements of the time indicator, i.e., the counter electrode 42, the electrolyte 44, the resistive system 46, the conductive adhesive 48, and the backing layer 50. These elements are covered with a releasable protective liner.

To activate the badge 24 (or the time indicator 40) the liner overlaying the gel and/or adhesive 44, 48 on and the back part 54 is removed and the back part 54 is applied to or layed over the front part 52, that is or includes the reflective metalized film 28. If the time indicator 40 is not an integral part of the badge 24 when activated, after activation, it is insert in an opening 38 in information card or insert 36 and both are sealed between two plastic laminates to form a laminate case 34. The reaction in the badge 24 initiated by this closing of the circuit in the "cell".

In another embodiment of the time indicator badge 24, the badge 24 has all of the foregoing elements partially sealed in a laminate case 34 that has a tab insert or liner 56 separating the gel 44 form the metalized film 28. After removing the tab insert or liner 56, the gel 44 and metalized film 28 are then pressed together and sealed. This activates the badge 24 by starting the electrochemical process. (See, FIGS. 2 & 3)

In another embodiment of this invention, after a predetermined period of time the opaque metalized film 28 on the badge 24 may be made porous or transmissive to a dye or other migrating agent (such as a dye precursor) by means of oxidation or chemical depletion of the metal atoms from the film 28. This porous film 28 now permits the dye or other migrating agent to pass to the front of the film 28 to cause a color change.

In another embodiment of this invention Applicant has discovered that the metalized film 28 may be made into antennas or electronic circuits that re-radiate an RF signal or conduct a current for an internal device. Once the metalized film 28 has been converted to an oxide or depleted of metal atoms after the predetermined period of time has elapsed it causes the circuit to break and a signal receiving device detects that the identification badge 24 has expired.

Still in another embodiment, the badge 24 may be used with a magnetic field sensor that detects changes in the (electro)magnetic properties of the metalized film electrode 28, e.g. changes in its paramagnetic, ferromagnetic or antiferromagnetic properties caused by the electrochemical reaction.

In most of these embodiments, the rate of change in the reflectivity of metal film 28 (indicator electrode) is governed by the film's 28 thickness, the ionic concentration of the electrolyte 44, and/or the rate of current flow controlled by the resistor.

Referring to FIGS. 2–5, in either electrical or chemical decompositions, the metalized film 28 is converted to an oxide, e.g., aluminum to aluminum oxide, which is substantially transparent so that the VOID indicia is displayed or, as in the preferred embodiment, the retoreflectiveness of the film 28 is eliminated to trigger an alarm.

Figure 3:
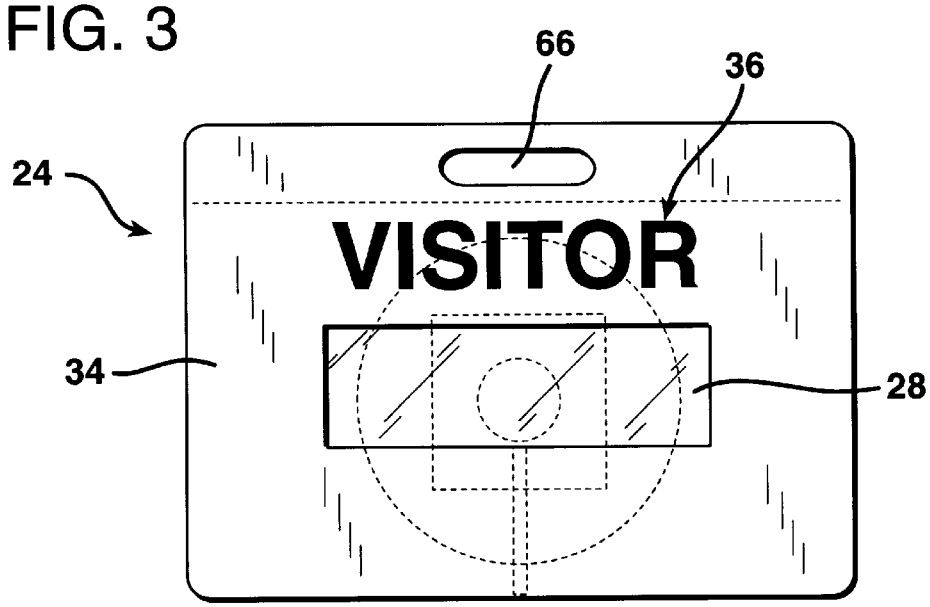
FIG. 3 shows the embodiment of the identification badge of FIG. 2, after activation.

Referring to FIGS. 2 & 3, a preferred embodiment of the badge 24, the surface of metallic film 28, e.g., an aluminum foil, is not co-planar, i.e. the surface of the film 28 is not flat. For the film 28 to be reflective and to retroreflect back to the scanner or other sensing device 20, the surface of the film 28 is embossed with a plurality of polymer protrusions, such as polyester protrusions. These protrusions resemble corner cubes or pyramid shaped structures across the surface of the film 28.

Still referring to FIG. 2, the badge 24 is shown prior to activation, i.e., it is open. In order to activate the badge it is folded into position for activation, see FIG. 3, to initiate the start of the predetermined period of time. Referring to FIGS. 2–3, the badge 24 includes three panels 58a, b & c hingedly joined along corresponding weakened portions to facilitate folding of the badge 24 into its activated stage. The first panel 58a is provided with a fabric 60 impregnated with an electrolyte, preferably a hydrogel electrolyte 44. An adhesive patch 62 overlays the fabric 60 to adhere it to the panel 58a. The adhesive patch 62 also adhesively engages the second panel 58b when the second panel 58a is folded onto the first panel 58b in order to activate the badge 24. A counterelectrode 42 is disposed underneath the electrolyte 44. A conductive element 64 extends from the counterelectrode 42 to the metalized film on the second panel 58b. When the first and second panels 58a,b are folded together to activate the badge 24, the metallic film 28 comes into contact with the fabric 60 impregnated with the electrolyte 44. This activation "completes the circuit" to cause a flow of current that causes the chemical alteration of the metallic film 28 to alter the reflectiveness of the metallic film 28. Panel 58c is folded over 58b to provide a reinforced attachment means 66 for attaching to a clip or pin for attachment to a persons clothing.

Figure 4:
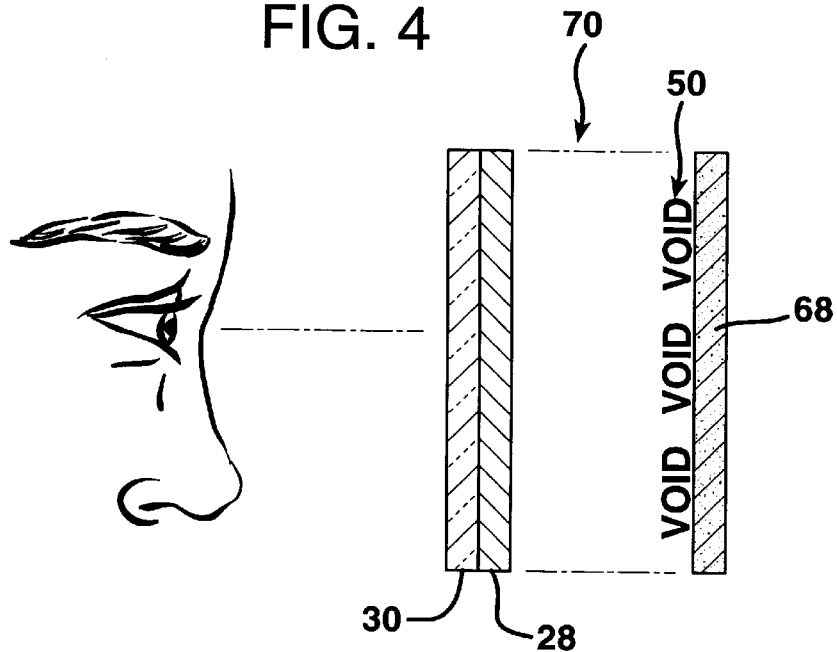
FIGS. 4 & 5 show the construction of another embodiment of the identification badge of this invention wherein the metallic film is altered by a chemical reaction.
Figure 5:
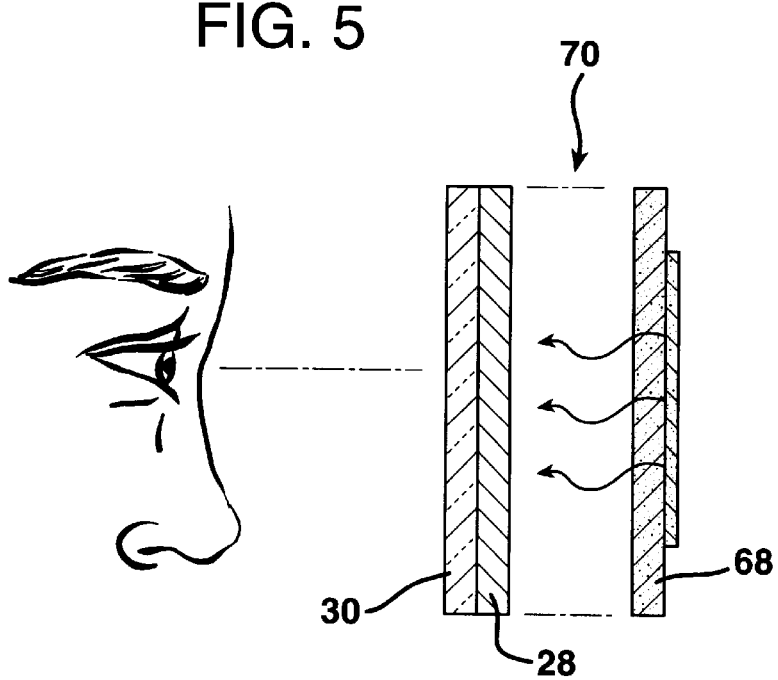

Referring to FIGS. 4 & 5, the metalized film 28 of the badge 24 is altered by a chemical reaction. The badge 24 comprises a clear substantially transparent substrate formed from a polymer material 30. A metalized coating or film 28, such as aluminum, is disposed along a surface of the support substrate 30. A third substrate 68 is provided, spaced apart from the metalized film 28 so that a void 70 is provided therebetween. When the substrate 68, containing a chemical oxidizer, is brought into contact with the metalized, e.g., aluminum, film, the chemicals in the substrate 68 will oxidize and/or react with the aluminum over a predetermined period of time. Oxidizers of choice are peroxide and other oxidizing agents, such as perborates or pensulfates. These materials release oxygen in aqueous media to cause the aluminum or other metallic film 28 to oxidize. Oxidation of the aluminum film 28 results in the film 28 being converted to an aluminum oxide which is transparent to the viewer. As the chemical agent reacts with the metalized film 28, the film 28 is altered and becomes porous so that a colored dye disposed along a surface of the substrate 68 leaches through the substrate to the metalized film 28, which is now porous and transparent due to oxidation, so that it may be viewed through the clear support substrate 30 by an observer, such as a security guard.

Figure 6:
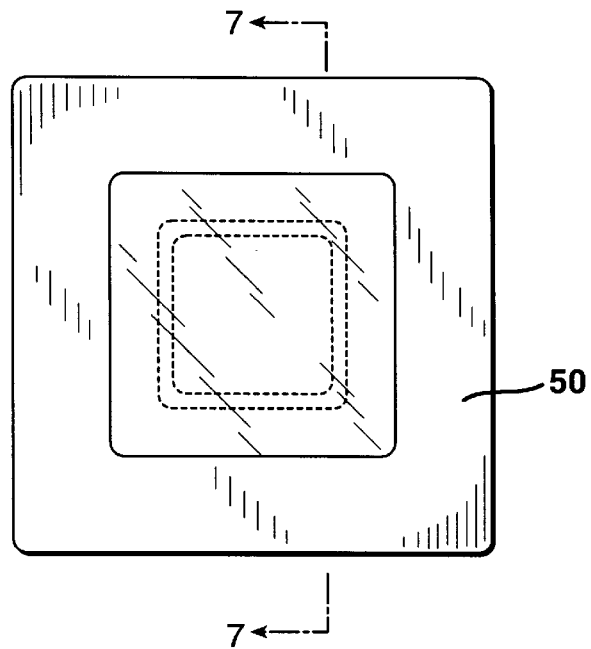
FIG. 6 shows a another embodiment of the identification badge of this invention.
Figure 7:
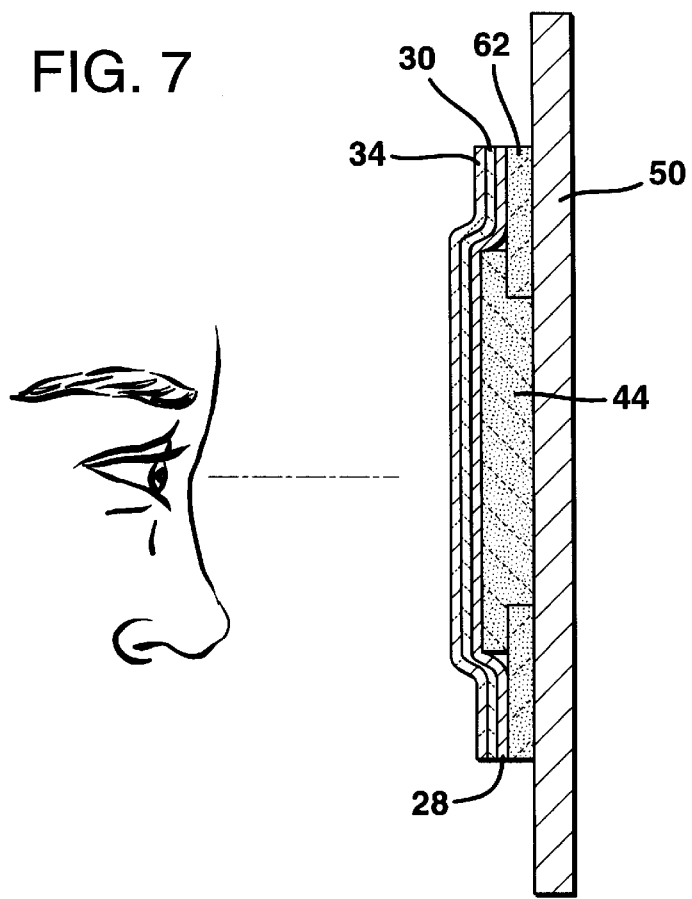
FIG. 7 is a cross sectional view taken along the line 7—7 of FIG. 6.
Figure 8:
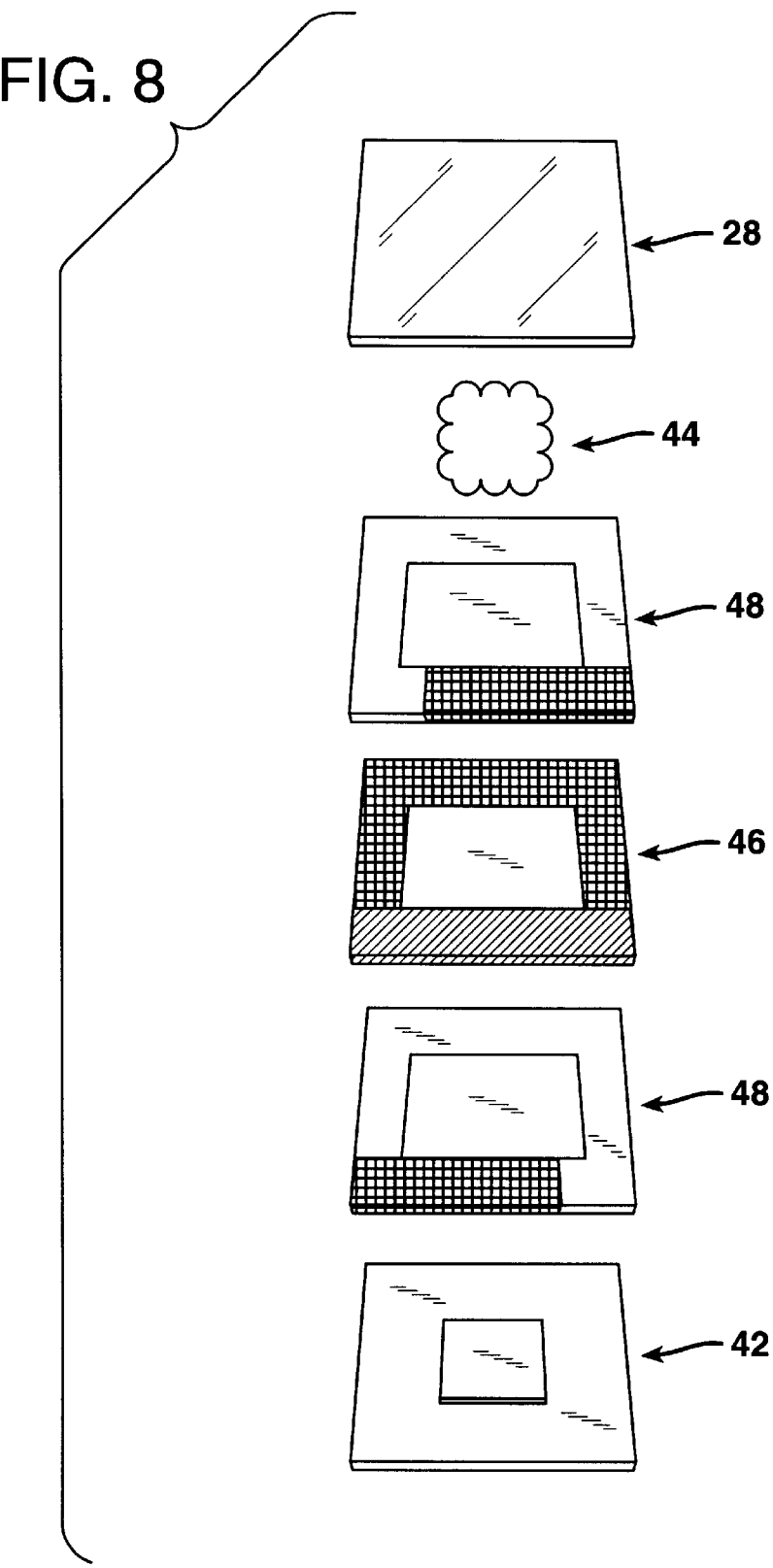
FIGS. 8–10 are exploded schematics of still other embodiments of the identification badges used in this invention.
Figure 9:
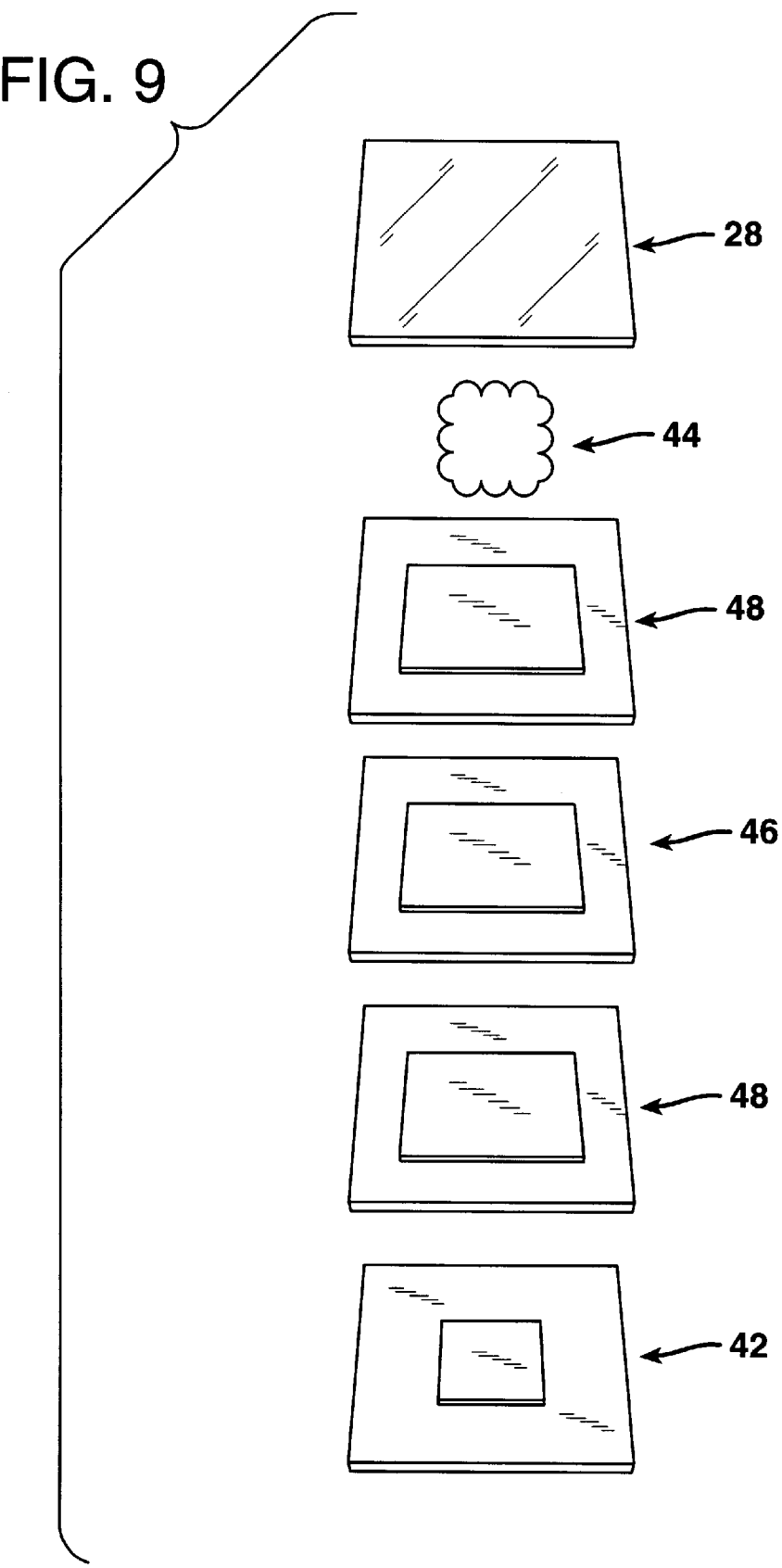
Figure 10:
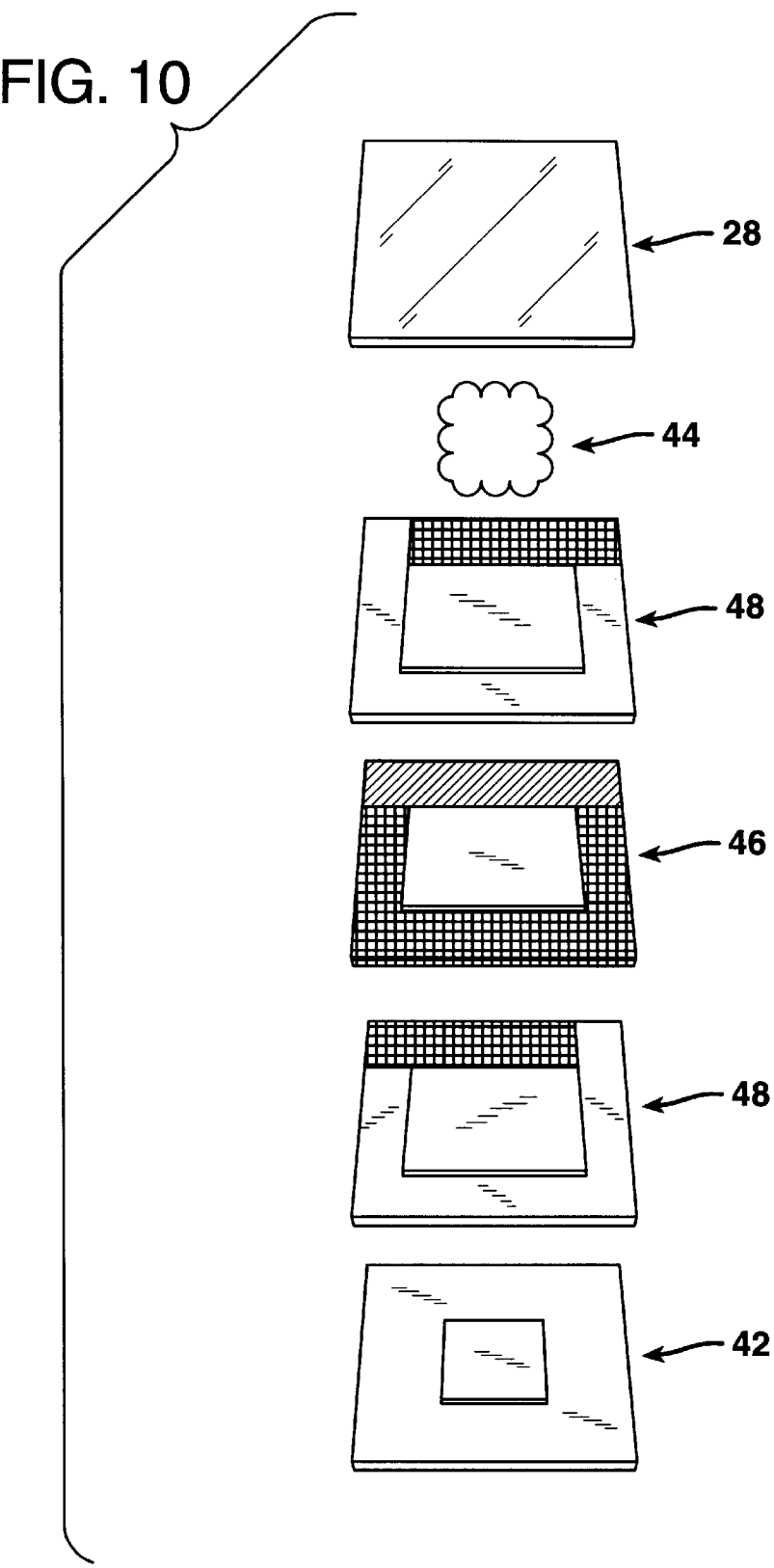

FIGS. 6 & 7, shows an arrangement of a time indicator 40. The indicator 40 comprises a polymer laminate 34, a transparent conductive layer 30; an aluminum film or foil coating 28; a conductive adhesive 62; a conductive adhesive gel 44; and a back 54 portion of the badge 24. The conductive layer 30 prevents the aluminum film 28 from developing "islands" in the center of the unit that may become insulated from further oxidation. The circuit between the conductive adhesive gel 44 and the entire coated aluminum film 28 is completed all around the aluminum edge by a conductive PSA adhesive 62 that seals the unit together at the time of issue for activation.

It is understood that the embodiments described herein are merely exemplary and that a person skilled in the art may make many variations and modifications without departing from the spirit and scope of the invention. All such variations and modifications are intended to be included within the scope of the invention.

What is claimed is:

1. A security system comprising:

a time dependant security badge to be worn by a person, the security badge comprising:

a metalized reflective film having an upper surface having an initial reflectivity and a lower surface;

an oxidizing film for electrochemically oxidizing the initial metalized reflective surface to a final reflectivity after the passage of a predetermined period of time when placed in contact with the lower surface of the metalized film; and an attachment means for attaching the badge to a person;

a means for illuminating the badge with a predetermined wavelength of light;

a means for scanning and detecting the reflectivity of the upper surface of the metalized reflective film to signal an initial security status of the person when it detects the initial reflectivity of the metalized reflective film and to signal a final security status of the person when it detects the final reflectivity of the metalized reflective film.

2. The system of claim 1, wherein the final reflectivity of the metalized reflective film upper surface having substantial transparency.

3. The system of claim 1, wherein the metalized reflective film is an electrode and the oxidizing film is a counter electrode in contact with an electrolyte in contact with the lower surface of the metalized film.

4. The system of claim 1, further comprising a migrating dye in contact with the lower surface of the metalized film; and wherein the oxidizing film renders the metalized film porous so that the migrating dye migrates through such porous surface and after the passage of a predetermined period of time changes the initial reflectivity to the final reflectivity.

* * * * *